United States Patent
Lair et al.

(10) Patent No.: US 11,811,625 B2
(45) Date of Patent: Nov. 7, 2023

(54) METHOD, APPARATUS, AND COMPUTER PROGRAM

(71) Applicant: NOKIA SOLUTIONS AND NETWORKS OY, Espoo (FI)

(72) Inventors: Yannick Lair, Voisins le Bretonneux (FR); Devaki Chandramouli, Plano, TX (US); Georgios Gkellas, Petroupoli Attikis (GR); Bruno Landais, Pleumeur-Bodou (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 1 day.

(21) Appl. No.: 17/267,227

(22) PCT Filed: Aug. 10, 2018

(86) PCT No.: PCT/EP2018/071836
§ 371 (c)(1),
(2) Date: Feb. 9, 2021

(87) PCT Pub. No.: WO2020/030291
PCT Pub. Date: Feb. 13, 2020

(65) Prior Publication Data
US 2021/0168055 A1 Jun. 3, 2021

(51) Int. Cl.
*G06F 15/173* (2006.01)
*H04L 41/5051* (2022.01)
(Continued)

(52) U.S. Cl.
CPC ...... *H04L 41/5051* (2013.01); *H04L 41/0813* (2013.01); *H04L 41/5087* (2013.01); *H04L 67/51* (2022.05); *H04L 67/52* (2022.05)

(58) Field of Classification Search
None
See application file for complete search history.

(56) References Cited

U.S. PATENT DOCUMENTS

2006/0245426 A1\* 11/2006 Rasanen ............... H04L 67/14
370/389
2017/0303259 A1 10/2017 Lee et al.
2018/0352501 A1\* 12/2018 Zhang ................. H04W 48/18

FOREIGN PATENT DOCUMENTS

CN 107743307 A 2/2018
CN 107770815 A 3/2018
(Continued)

OTHER PUBLICATIONS

Examination Report for Indian Application No. 202147009089 dated Jan. 29, 2022, 7 pages.
(Continued)

*Primary Examiner* — Atta Khan
(74) *Attorney, Agent, or Firm* — ALSTON & BIRD LLP (57) ABSTRACT

Preference information is received at a network repository function from a first network function, the preference information indicating one or more optional preferences for a respective second network function or network function service. Information is provided to the first network function about one or more second network functions or network function services, the one or more second network functions or network function services being selected taking into account the preference information.

20 Claims, 8 Drawing Sheets

(51) Int. Cl.
  *H04L 41/0813* (2022.01)
  *H04L 41/50* (2022.01)
  *H04L 67/51* (2022.01)
  *H04L 67/52* (2022.01)

(56) References Cited

FOREIGN PATENT DOCUMENTS

| CN | 108337705 A | 7/2018 |
|---|---|---|
| EP | 3358887 A1 | 8/2018 |
| WO | WO 2017/113109 A1 | 7/2017 |

OTHER PUBLICATIONS

"3rd Generation Partnership Project; Technical Specification Group Core Network and Terminals; 5G System; Network Function Repository Services; Stage 3 (Release 15)", 3GPP TS 29.510 v15.0.0 (Jun. 15, 2018), 64 pages.

"3rd Generation Partnership Project; Technical Specification Group Services and System Aspects; Procedures for the 5G System; Stage 2 (Release 15)", 3GPP TS 23.502 v15.2.0 (Jun. 19, 2018), 308 pages.

"3rd Generation Partnership Project; Technical Specification Group Services and System Aspects; System Architecture for the 5G System; Stage 2 (Release 15)", 3GPP TS 23.501 v15.2.0 (Jun. 19, 2018), 217 pages.

Ericsson et al., "Update of the Service Instance Set Solution", SA WG2 Meeting #128, S2-187509, (Jul. 2, 2018), 4 pages.

Ericsson, "Solution Proposal 'Improvements to the service framework' to address key issue 'improvements to service framework related aspects'", SA WG2 Meeting #128, S2-186415, (Jul. 2, 2018), 2 pages.

International Search Report and Written Opinion for Application No. PCT/EP2018/071836 dated Mar. 8, 2019, 10 pages.

Nokia et al., "Corrections to NF Profile Description", SA WG2 Meeting #128, S2-187056 (Jul. 2, 2018), 3 pages.

Nokia et al., "Corrections to NRF Services Description", SA WG2 Meeting #128, S2-187054 (Jul. 2, 2018), 8 pages.

Nokia et al., "NF Location in Discovery Request", 3GPP TSG CT WG4 Meeting #86, C4-186227, (Aug. 20, 2018), 10 pages.

Nokia et al., "Preferred Target NF Location in Discovery Request", 3GPP TSG CT WG4 Meeting #87, C4-188620, (Nov. 26, 2018), 7 pages.

Office Action for Chinese Application No. 201880096548.7 dated Jan. 12, 2023, 11 pages.

\* cited by examiner

METHOD, APPARATUS, AND COMPUTER PROGRAM

CROSS-REFERENCE TO RELATED APPLICATIONS

This application is a national phase entry of International Application No. PCT/EP2018/071836, filed Aug. 10, 2018, the entire contents of which are incorporated herein by reference.

FIELD

The present application relates to a method, apparatus, and computer program.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to a first aspect, there is provided an apparatus comprising means for: receiving, at a network repository function, preference information from a first network function, said preference information indicating one or more optional preferences for a respective second network function or network function service; and causing information to be provided to said first network function about one or more second network functions or network function services, said one or more second network functions or network function services being selected taking into account said preference information.

In an example, a respective selected second network function or network function service optionally is provided with one or more of said optional preferences.

In an example, said preference information comprises location information.

In an example, said preference information is received in a discovery request message.

In an example, said preference information is received with one or more query parameters.

In an example, said means is for causing information to be provided to said first network function about all of the second network functions or network function services that match the one or more query parameters when there is no match to said preference information.

In an example, said means is for providing a candidate list of second network functions or network function services in dependence on said one or more query parameters, each of said second network functions or network function services of said candidate list satisfying said one or more query parameters.

In an example, said means is for filtering said candidate list of second network functions or network function services in dependence on said preference information.

In an example, said means is for providing a priority or modifying a priority of one or more second network functions or network function services in said candidate list of second network functions or network function services in dependence on said preference information.

In an example, said preference information comprises information indicating how said network repository function should select second network functions or network function services if no second network functions or network function services match the preference information.

In an example, said means is for determining which of said second network functions or network function services is to be selected when there is no match to said preference information.

According to a second aspect, there is provided an apparatus comprising means for: causing, at a first network function, preference information to be provided to a network repository function, said preference information indicating one or more optional preferences for a respective second network function or network function service; and receiving information, from said network repository function, about one or more second network functions or network function services, said one or more second network functions or network function services being selected taking into account said preference information.

In an example, a respective selected second network function or network function service optionally is provided with one or more of said optional preferences.

In an example, said preference information comprises location information.

In an example, said preference information is provided in a discovery request message.

In an example, said preference information is provided with one or more query parameters.

In an example, said means is for receiving information from said network repository function about all of the second network functions or network function services that match the one or more query parameters when there is no match to said preference information.

In an example, said means is for receiving a candidate list of second network functions or network function services in dependence on said one or more query parameters, each of said second network functions or network function services of said candidate list satisfying said one or more query parameters.

In an example, said candidate list of second network functions or network function services is filtered in dependence on said preference information.

In an example, one or more of said second network functions or network function services is said candidate list is provided with a priority in dependence on said preference information.

In an example, said preference information comprises information indicating how said network repository function should select second network functions or network function services if no second network functions or network function services match the preference information.

According to a third aspect, there is provided an apparatus comprising: at least one processor; at least one memory including computer program code; wherein the at least one memory and computer program code is configured, with the at least one processor, to cause the apparatus at least to: receiving, at a network repository function, preference information from a first network function, said preference information indicating one or more optional preferences for a respective second network function or network function service; and causing information to be provided to said first network function about one or more second network functions or network function services, said one or more second network functions or network function services being selected taking into account said preference information.

In an example, a respective selected second network function or network function service optionally is provided with one or more of said optional preferences.

In an example, said preference information comprises location information.

In an example, said preference information is received in a discovery request message.

In an example, said preference information is received with one or more query parameters.

In an example, the at least one memory and computer program code is configured, with the at least one processor, to cause the apparatus to cause information to be provided to said first network function about all of the second network functions or network function services that match the one or more query parameters when there is no match to said preference information.

In an example, the at least one memory and computer program code is configured, with the at least one processor, to cause the apparatus to provide a candidate list of second network functions or network function services in dependence on said one or more query parameters, each of said second network functions or network function services of said candidate list satisfying said one or more query parameters.

In an example, the at least one memory and computer program code is configured, with the at least one processor, to cause the apparatus to filter said candidate list of second network functions or network function services in dependence on said preference information.

In an example, the at least one memory and computer program code is configured, with the at least one processor, to cause the apparatus to provide a priority or modify a priority of one or more second network functions or network function services in said candidate list of second network functions or network function services in dependence on said preference information.

In an example, said preference information comprises information indicating how said network repository function should select second network functions or network function services if no second network functions or network function services match the preference information.

In an example, the at least one memory and computer program code is configured, with the at least one processor, to cause the apparatus to determine which of said second network functions or network function services is to be selected when there is no match to said preference information.

According to a fourth aspect, there is provided an apparatus comprising: at least one processor; at least one memory including computer program code; wherein the at least one memory and computer program code is configured, with the at least one processor, to cause the apparatus at least to: causing, at a first network function, preference information to be provided to a network repository function, said preference information indicating one or more optional preferences for a respective second network function or network function service; and receiving information, from said network repository function, about one or more second network functions or network function services, said one or more second network functions or network function services being selected taking into account said preference information.

In an example, a respective selected second network function or network function service optionally is provided with one or more of said optional preferences.

In an example, said preference information comprises location information.

In an example, said preference information is provided in a discovery request message.

In an example, said preference information is provided with one or more query parameters.

In an example, the at least one memory and computer program code is configured, with the at least one processor, to cause the apparatus to receive information from said network repository function about all of the second network functions that match the one or more query parameters when there is no match to said preference information.

In an example, the at least one memory and computer program code is configured, with the at least one processor, to cause the apparatus to receive a candidate list of second network functions or network function services in dependence on said one or more query parameters, each of said second network functions or network function services of said candidate list satisfying said one or more query parameters.

In an example, said candidate list of second network functions or network function services is filtered in dependence on said preference information.

In an example, one or more of said second network functions or network function services is said candidate list is provided with a priority in dependence on said preference information.

In an example, said preference information comprises information indicating how said network repository function should select second network functions or network function services if no second network functions or network function services match the preference information.

According to a fifth aspect, there is provided an method comprising: receiving, at a network repository function, preference information from a first network function, said preference information indicating one or more optional preferences for a respective second network function or network function service; and causing information to be provided to said first network function about one or more second network functions or network function services, said one or more second network functions or network function services being selected taking into account said preference information.

In an example, a respective selected second network function or network function service optionally is provided with one or more of said optional preferences.

In an example, said preference information comprises location information.

In an example, said preference information is received in a discovery request message.

In an example, said preference information is received with one or more query parameters.

In an example, the method comprises causing information to be provided to said first network function about all of the second network functions or network function services that match the one or more query parameters when there is no match to said preference information.

In an example, for the method comprises providing a candidate list of second network functions or network function services in dependence on said one or more query parameters, each of said second network functions or network function services of said candidate list satisfying said one or more query parameters.

In an example, for the method comprises filtering said candidate list of second network functions or network function services in dependence on said preference information.

In an example, for the method comprises providing a priority or modifying a priority of one or more second network functions or network function services in said candidate list of second network functions or network function services in dependence on said preference information.

In an example, said preference information comprises information indicating how said network repository function should select second network functions or network function services if no second network functions or network function services match the preference information.

In an example, the method comprises determining which of said second network functions or network function services is to be selected when there is no match to said preference information.

According to a sixth aspect, there is provided an method comprising: causing, at a first network function, preference information to be provided to a network repository function, said preference information indicating one or more optional preferences for a respective second network function or network function service; and receiving information, from said network repository function, about one or more second network functions or network function services, said one or more second network functions or network function services being selected taking into account said preference information.

In an example, a respective selected second network function or network function service optionally is provided with one or more of said optional preferences.

In an example, said preference information comprises location information.

In an example, said preference information is provided in a discovery request message.

In an example, said preference information is provided with one or more query parameters.

In an example, the method comprises receiving information from said network repository function about all of the second network functions or network function services that match the one or more query parameters when there is no match to said preference information.

In an example, the method comprises receiving a candidate list of second network functions or network function services in dependence on said one or more query parameters, each of said second network functions or network function services of said candidate list satisfying said one or more query parameters.

In an example, said candidate list of second network functions or network function services is filtered in dependence on said preference information.

In an example, one or more of said second network functions or network function services is said candidate list is provided with a priority in dependence on said preference information.

In an example, said preference information comprises information indicating how said network repository function should select second network functions or network function services if no second network functions or network function services match the preference information.

According to a seventh aspect, there is provided an computer program comprising code configured to, when the program is run on a processor, perform: receiving, at a network repository function, preference information from a first network function, said preference information indicating one or more optional preferences for a respective second network function or network function service; and causing information to be provided to said first network function about one or more second network functions or network function services, said one or more second network functions or network function services being selected taking into account said preference information.

In an example, a respective selected second network function or network function service optionally is provided with one or more of said optional preferences.

In an example, said preference information comprises location information.

In an example, said preference information is received in a discovery request message.

In an example, said preference information is received with one or more query parameters.

In an example, the code when run, is configured to cause information to be provided to said first network function about all of the second network functions or network function services that match the one or more query parameters when there is no match to said preference information.

In an example, the code, when run, is configured to provide a candidate list of second network functions or network function services in dependence on said one or more query parameters, each of said second network functions or network function services of said candidate list satisfying said one or more query parameters.

In an example, the code, when run, is configured to filter the candidate list of second network functions or network function services in dependence on said preference information.

In an example the code, when run, is configured to provide a priority or modifying a priority of one or more second network functions or network function services in said candidate list of second network functions or network function services in dependence on said preference information.

In an example, said preference information comprises information indicating how said network repository function should select second network functions or network function services if no second network functions or network function services match the preference information.

In an example, the code, when run, is configured to determine which of said second network functions or network function services is to be selected when there is no match to said preference information.

According to an eighth aspect, there is provided an computer program comprising code configured to, when the program is run on a processor, perform: causing, at a first network function, preference information to be provided to a network repository function, said preference information indicating one or more optional preferences for a respective second network function or network function service; and receiving information, from said network repository function, about one or more second network functions or network function services, said one or more second network functions or network function services being selected taking into account said preference information.

In an example, a respective selected second network function or network function service optionally is provided with one or more of said optional preferences.

In an example, said preference information comprises one location information.

In an example, said preference information is provided in a discovery request message.

In an example, said preference information is provided with one or more query parameters.

In an example, the code, when run, is configured to cause receive of information from said network repository function about all of the second network functions or network function services that match the one or more query parameters when there is no match to said preference information.

In an example, the code, when run, is configured to cause receiving of a candidate list of second network functions or network function services in dependence on said one or more query parameters, each of said second network functions or network function services of said candidate list satisfying said one or more query parameters.

In an example, said candidate list of second network functions or network function services is filtered in dependence on said preference information.

In an example, one or more of said second network functions or network function services is said candidate list is provided with a priority in dependence on said preference information.

In an example, said preference information comprises information indicating how said network repository function should select second network functions or network function services if no second network functions or network function services match the preference information.

Various other aspects and further embodiments are also described in the following detailed description and in the attached claims.

DESCRIPTION OF FIGURES

Embodiments will now be described, by way of example only, with reference to the accompanying Figures in which.

DETAILED DESCRIPTION

In general, the following disclosure relates to an example architecture, with associated apparatus, for a communication system. In particular, the following relates to an architecture and associated apparatus for a service based architecture.

A core network architecture may be service-based architecture (SBA), allowing some network functions (NFs), called NF service producers, to expose services to other authorized NFs, called NF service consumers, through a service-based interface.

Before explaining in detail the examples, certain general principles of a wireless communication system and mobile communication devices are briefly explained with reference to FIGS. 1 to 2 to assist in understanding the technology underlying the described examples.

Figure 1:
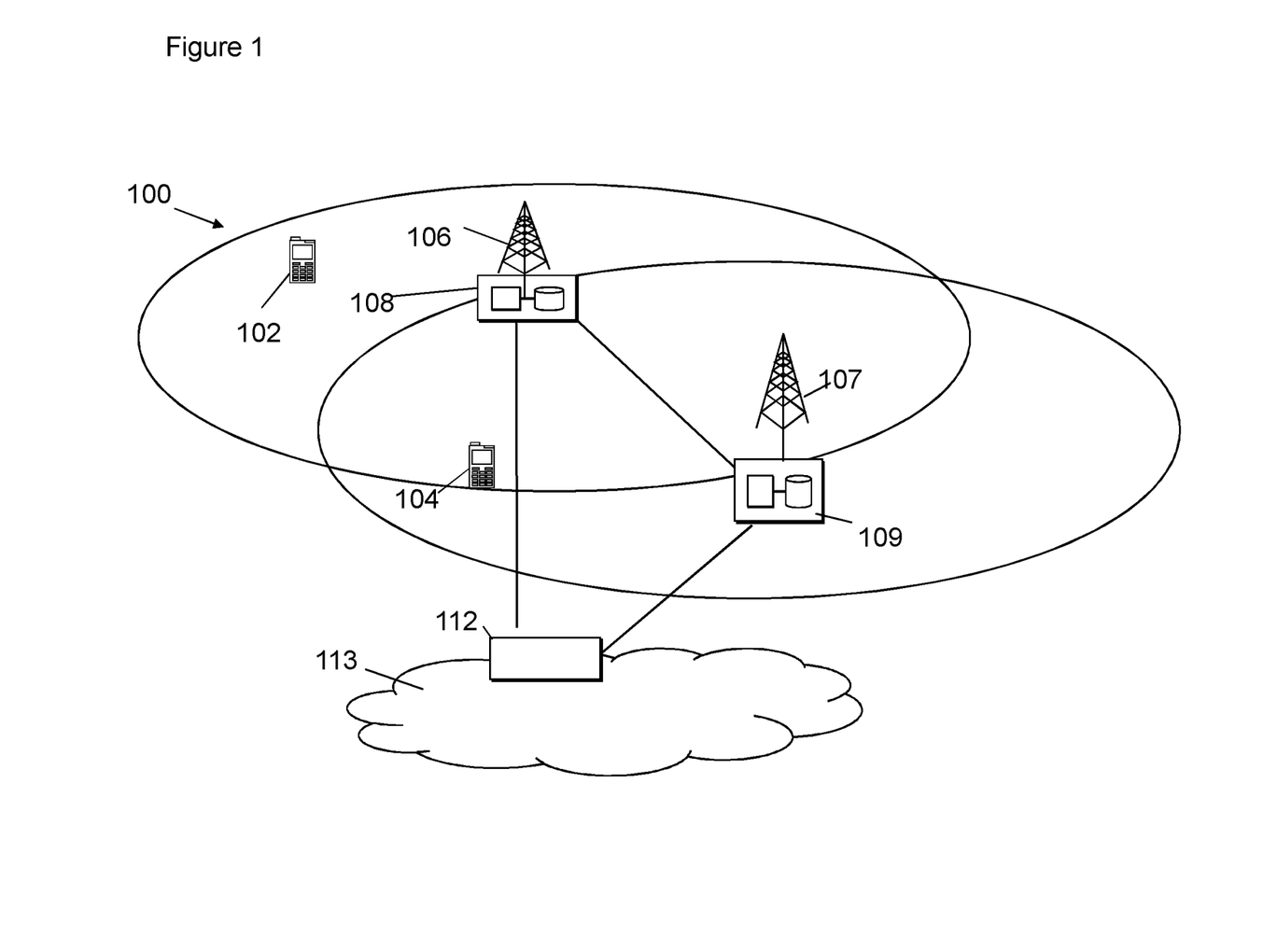
FIG. 1 shows a schematic diagram of an example communication system comprising a plurality of base stations and a plurality of communication devices.

In a wireless communication system 100, such as that shown in FIG. 1, mobile communication devices or user apparatus (UE) 102, 104 are provided wireless access via at least one base station or similar wireless transmitting and/or receiving node or point. A user can access the communication system by means of an appropriate communication device or terminal. A communication device of a user is may be a user equipment (UE) or a machine type terminal or any other suitable device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved.

A base station may be referred to more generally as simply a network apparatus or a network access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

There may be smaller base stations or cells (not shown) in some networks. These may be pico or femto level base stations or the like.

Figure 2:
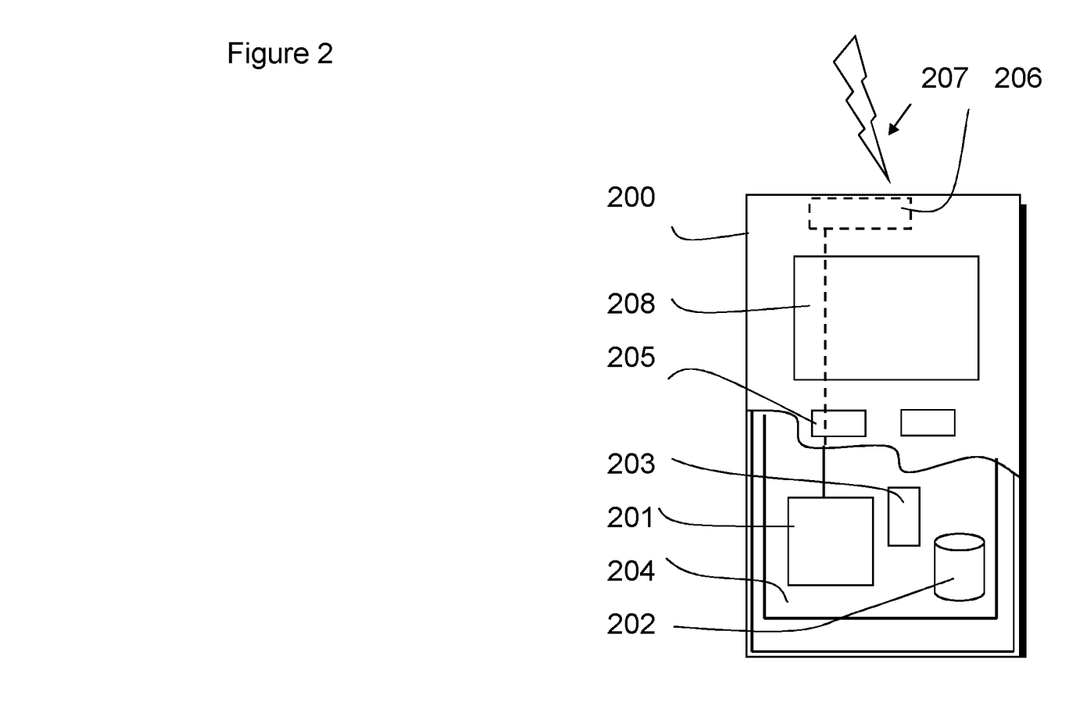
FIG. 2 shows a schematic diagram of an example communication device.

A possible communication device will now be described in more detail with reference to FIG. 2 showing a schematic, partially sectioned view of a communication device 200. Such a communication device may be a user equipment (UE) or terminal. An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, a machine type device or any combinations of these or the like.

The device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. This may be optional in some embodiments.

A display 208, a speaker and a microphone can be also provided. One or more of these may be optional in some embodiments.

A communication device may comprise appropriate connectors (either wired or wireless) to other devices and/or for connecting external accessories, for example hands-free equipment, thereto. One or more of these may be optional.

The communication devices may access the communication system based on various access techniques.

An example of wireless communication systems are architectures standardized by the 3rd Generation Partnership Project (3GPP). A latest 3GPP based development is often referred to as 5G. Other examples of radio access system comprise those provided by base stations of systems that are based on technologies such as wireless local area network (WLAN) and/or WiMAX (Worldwide Interoperability for Microwave Access). It should be appreciate that although some embodiments are described in the context of a 5G system, other embodiments may be provided in any other suitable system including but not limited to subsequent systems or similar protocols defined outside the 3GPP forum.

Figure 3:
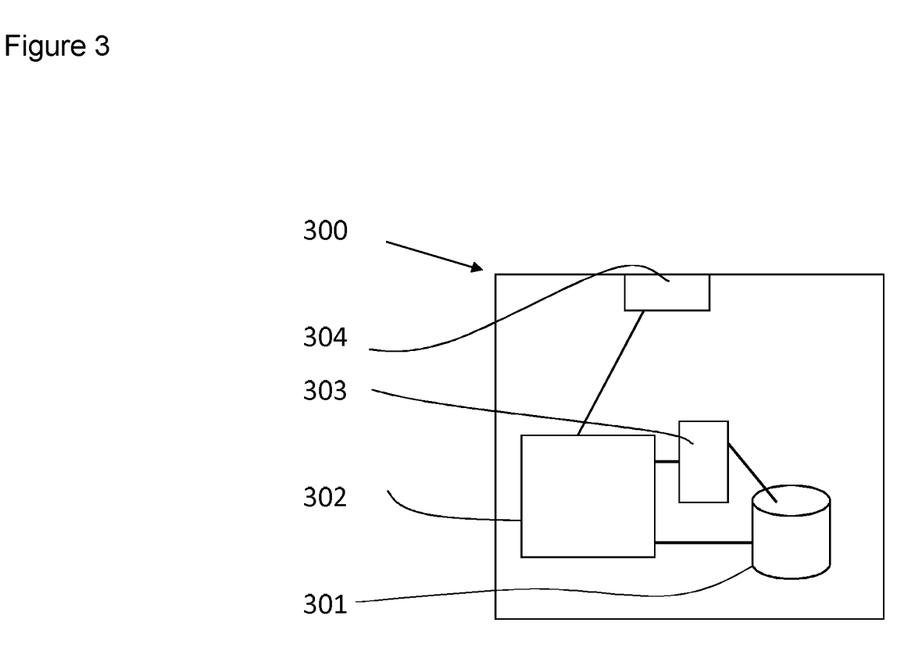
FIG. 3 shows a schematic diagram of an example network function.

An example apparatus is shown in FIG. 3. FIG. 3 shows an example of an apparatus 300 for a network function such as a network repository function (NRF) or an access node or any other suitable function. The apparatus 300 comprises at least one memory 301, at least one data processing unit 302, 303 and an input/output interface 304. For example the apparatus 300 can be configured to execute an appropriate software code to provide functions. The apparatus 300 may be included in a chipset apparatus.

The proposed 5G system supports a service based architecture. A service based architecture utilises a service based framework for a variety of communications-related processes, such as service registration, deregistration, discovery, selection, routing, etc. A service-based architecture is characterised by, instead of having predefined interfaces between network elements, using a services model in which components query a network function repository function (NRF) to discover and communicate with each other over application programming interfaces (APIs). An API is a function and/or procedure that allows the creation of application which access the features or data of an operating system, application or other service.

To support this service architecture, there are described/provided a plurality of functional entities (also known as network functions, NFs). Aside from the above-mentioned NRF, other network functions may comprise one or more of:

Access and mobility management function (AMF): the AMF may provide features relating to UE-based authentication, authorisation, registration, mobility and connection management. The AMF may be independent of access technology type, and so a UE may be connected to an AMF regardless of the access technology used;

Session Management function (SMF): the SMF may provide session management functions, including allocating Internet Protocol (IP) addresses to UEs. If a UE has multiple sessions, different SMFs may be allocated to each session to manage them individually;

Policy control function (PCF): the PCF may use information on the packet flow between two communicating entities to determine policies about mobility and session management for a given UE for the AMF and SMF to enforce this;

Unified data management function (UDM): the UDM may store subscription data for a UE;

Application function (AF): the AF may provide information on the packet flow to the PCF for supporting quality of services; and Authentication server function (AUSF): the AUSF may support authentication of a UE.

Some embodiments may be supported by one or more of the above functions. In some embodiments, one or more of these functions may be as set out in sub clause 6.2 of 3GPP TS 23.501

In Rel-15 of the 5G architecture, some network functions (NFs), called NF service producers, expose services to other authorized NFs, called NF service consumers, through a service-based interface.

Figure 4:
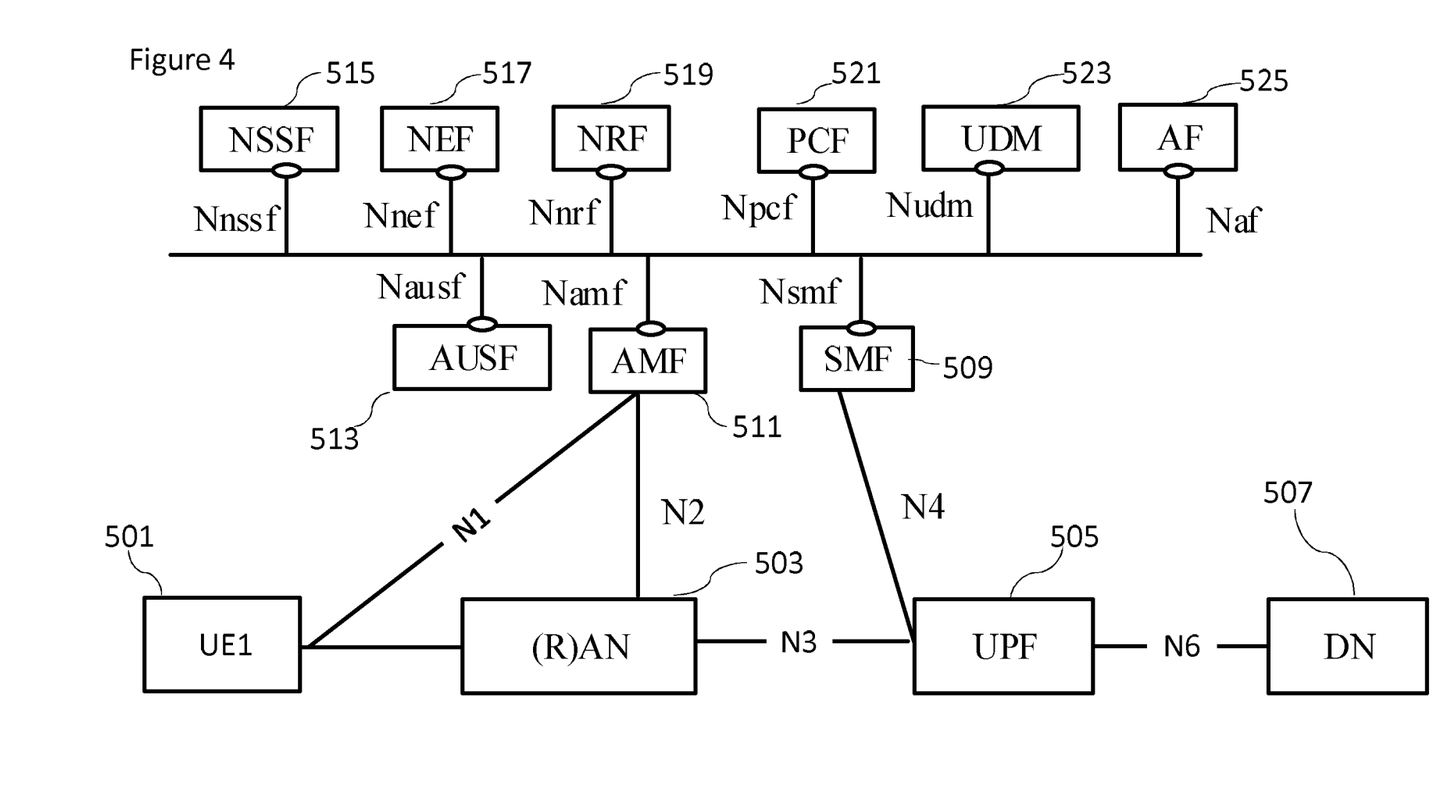
FIG. 4 shows a schematic diagram of a distributed services network.

An example architecture for such a services-based architecture is depicted in FIG. 4.

The architecture shows a user equipment (UE) 501 connected to a (radio) access network ((R) AN or 5G-AN) 503 at the access stratum, as well as an access and mobility management function (AMF) 511 at the non-access stratum. The RAN represents a base station using so-called "new" RAT (radio access technology) and evolved LTE, for example a gNodeB (gNB). An AN (access node) is a general base station including non-3GPP access, e.g., Wi-Fi. A 5G-AN may be a 5G Access Network comprising a NG (next generation)-RAN and/or non-3GPP AN connecting to a 5G Core Network, e.g. a N3IWF (Non 3GPP Interworking Function).

It has been proposed that the fixed access may be integrated into the same 5G core network (5GC). Some embodiments may be applied in this context alternatively or additionally.

The 5G core network (5GC) consists of various network functions (NFs) as discussed previously. In FIG. 4 there are ten 5G core NFs. An access and mobility management function (AMF) 511, a session management function (SMF) 509, a policy control function (PCF) 521, an application function (AF) 525, an authentication server function (AUSF) 513, a user plane function (UPF) 505, unified data management (UDM) 523, a NF repository function (NRF) 519, a network exposure function (NEF) 517 and a network slice selection function (NSSF) 515. A data network (DN) 507 is shown.

In FIG. 4 we see the following interfaces or references connecting the NFs:

N1 is the interface between the UE and the AMF.
N2 is the interface between the (R)AN and the AMF.
N3 is the interface between the (R)AN and the UPF.
N4 is the interface between the UPF and the SMF.
N6 is the interface between the UPF and the DN.

Figure 5:
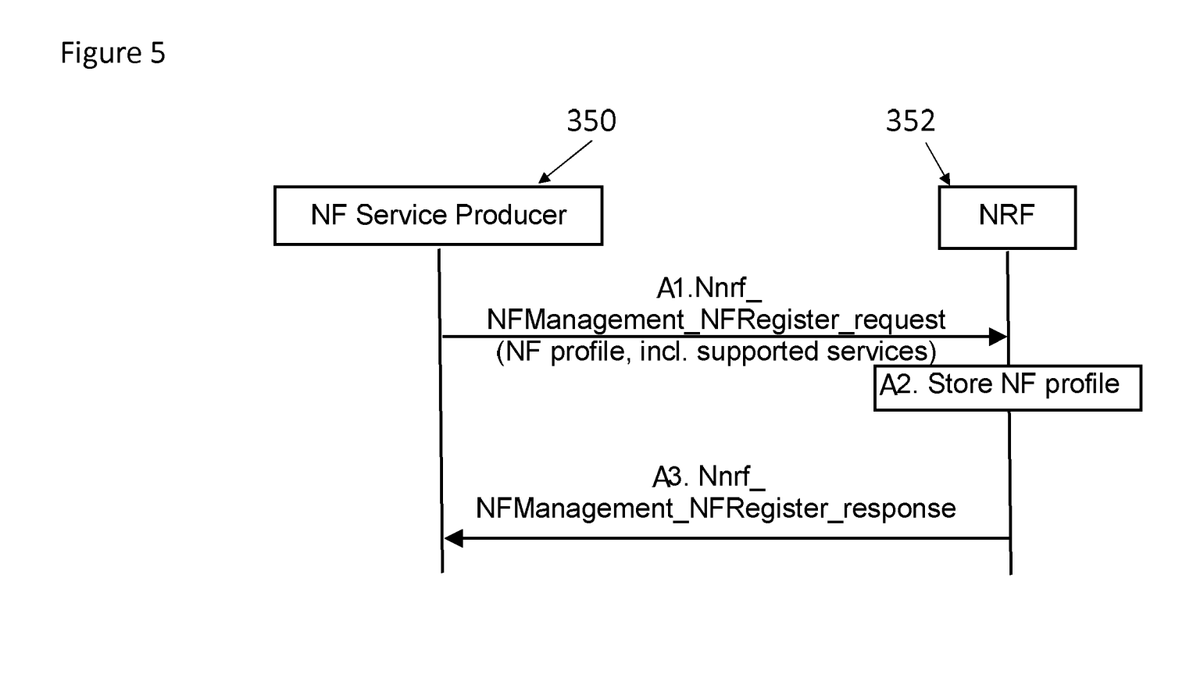
FIG. 5 shows an example signalling diagram for a registration procedure.

Reference is made to FIG. 5 which shows a registration procedure between a NF service producer 350 and a NRF 352.

In step A1, upon instantiation or activation, a NF service producer 350 registers its profile into an NRF 352. This may be performed by sending a request with a NF profile.

This request may be a Nnrf NFManagement_NFRegister_request or any suitable request. The NF profile may comprise one or more of:

general information for the NF. For example this information may comprise one or more of: the PLMN for the NF; addressing information; static capacity; operator defined information about the location of the NF (hereinafter referred to as locality); and priority.

information which is specific to the NF type. For example, this may be an AMF set for an AMF or a range of supported identities for a UDM.

the list of services supported by the NF, optionally with one or more parameters specific to these services, such as static capacity and/or priority.

In step A2, the NF profile is stored by the NRF 352.

In step A3, the NRF 352 will provide a response. This response will indicate that the profile has been stored. This response may be a Nnrf NFManagement_NFRegister_response or any suitable response.

This registration step allows these NFs and their supported services to be visible to other NFs. When an NF service consumer needs to call a specific service or to contact a specific NF or NF type, it triggers a discovery request towards the NRF 352 and the NRF 352 returns the NFs and the NF services which are registered, and which match the request from the NF service consumer. An example of this will now be described with reference to FIG. 6 which shows a NF/NF service discovery procedure.

Figure 6:
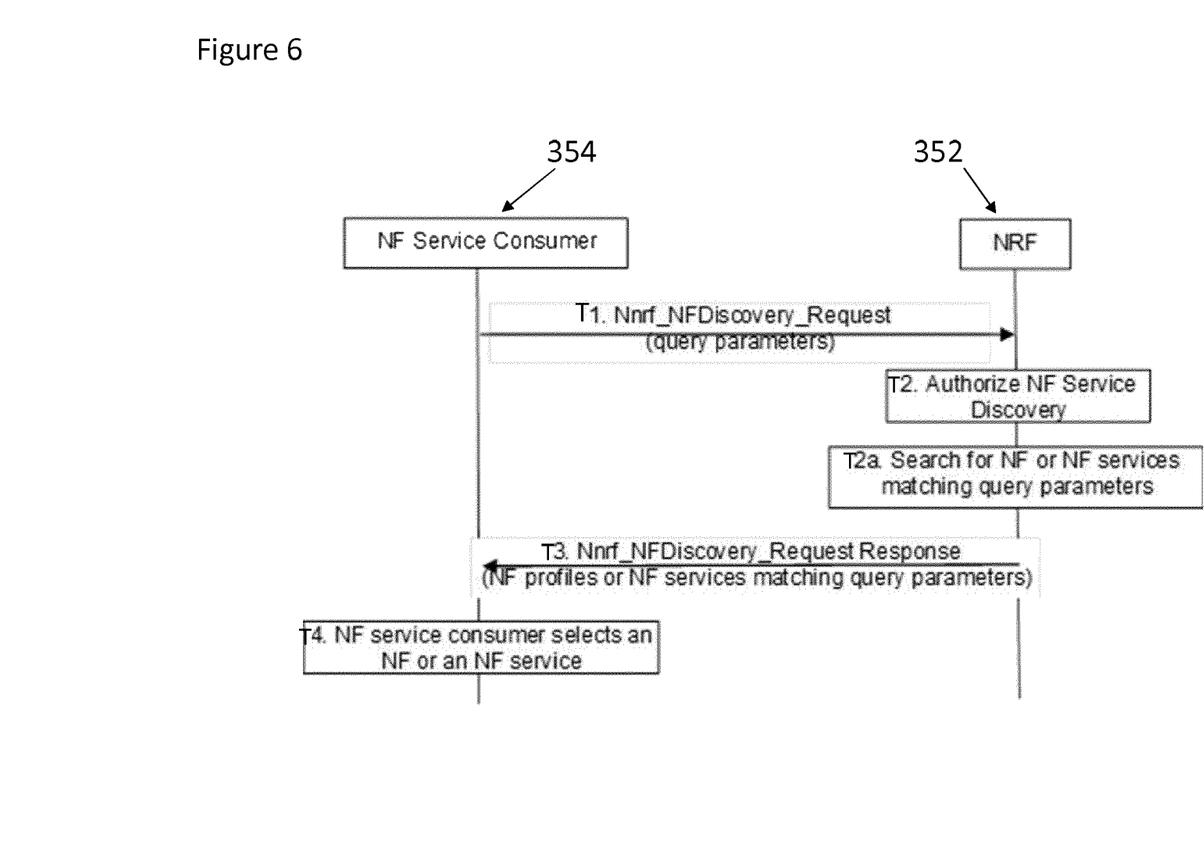
FIG. 6 shows an example signalling diagram for a discovery procedure.

In step T1, a NF service consumer 354 sends a request to the NRF 352. This may comprise one or more query parameters. The request may be a Nnrf Discovery_Request.

In step T2, the NRF 352 may authorize the NF service discovery request.

In step T2a, the NRF 352 may search for NFs or NF services matching the one or more query parameters.

In step T3, a response may be sent from the NRF 352 to the NF service consumer 354. The response may comprise NF profiles or NF services matching the one or more query parameters. In some embodiments, there may be one or more query parameters. The response will only return NF profiles or services if they match all the one or more query parameters. The response may be an Nnrf NFDiscovery_RequestResponse or any other suitable response.

In step T4, the NF service consumer 354 may select a NF or a NF service.

The concept of locality information in the NF profile has been proposed. This may allow an NF service producer 350 to provide information about its location, e.g. geographical area or data centre information or a desired location. Later, an NF service consumer 354 can trigger a discovery, and based on the NF profiles received from NRF 352, the NF service consumer 354 can select an NF service producer 350 which is close to the NF service consumer 354, thus optimizing performance. The query parameter may comprise a locality query parameter. The NF/NF service selection based on location information may be done by the NF service consumer 354, using results from discovery. There may be no control of the NF/NF service selection by the NRF 352. However, this NF/NF service location information may not be necessarily part of the NF service application logic, and, in some embodiments, could be handled by a framework function, i.e. the NRF 352.

The inclusion of location information in the discovery request, with the current specification of discovery procedure, may allow the NF service consumer 354 to request an NF service producer in a specific location. However, if the NRF 352 does not find any NF or NF service matching the requested location, the NRF 352 may indicate a failure of the discovery to the NF service consumer 354. The NF service consumer 354 may then need to trigger another discovery request with a different location, until the NF service consumer 354 receives a positive service indication from the NRF 352. This behaviour may not occur in some embodiments. In other embodiments, this behaviour may not be an issue. In some embodiments it may be desirable to mitigate the effects of this behaviour to reduce signalling.

Even if the NRF 352 returns NFs or NF services to the NF service consumer 354, as a result of discovery, there may be no guarantee that the NF service consumer 354 can actually call the discovered NF/NF service. For example, the NF service consumer 354 may not be able to call the discovered NF/NF service in case of a failure, or heavy load of the NF service producer. Therefore, the NF service consumer 354 may have to trigger several discovery requests before a service is successfully called.

In some embodiments, a mechanism is presented that may avoid back and forth signalling between the NF service consumers 354 and the NRF 352 in case, for example, the NF service consumer 354 requests are too restrictive in terms of requested locality, or in case, for example, the discovered NFs/NF services cannot be contacted.

In some embodiments, a mechanism is provided that may avoid that the selection of the NF or NF service based on locality, is done at NF service consumer 354 side only. Instead, in some embodiments, the logic of NF/NF service selection based on locality is at least partially decoupled from the NF service consumer application logic, allowing centralized control by the NRF 352.

Figure 7:
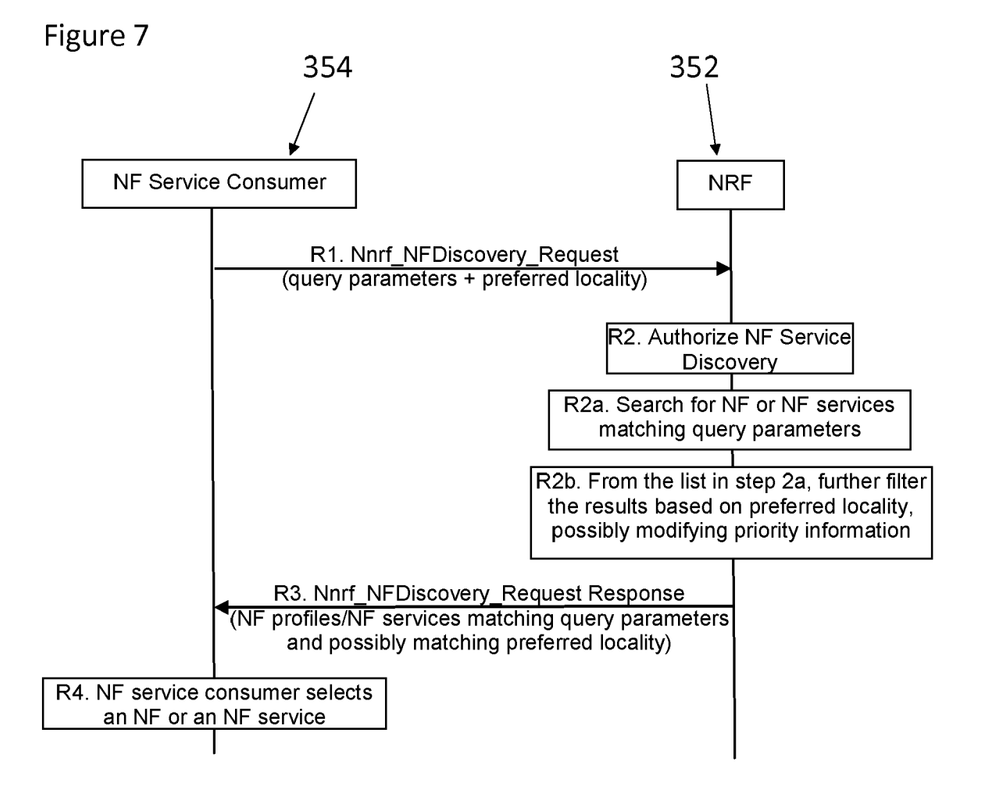
FIGS. 7 and 8 show example signalling diagrams for modified discovery procedures.

Reference is made to FIG. 7 which shows a NF/NF service discovery request procedure according to some embodiments.

In some embodiments, the locality information may be provided by the NF service consumer 354, in the discovery request, in the form of a preference, e.g. via a "preferred locality" parameter. This is shown in step R1 whereby the NF service consumer transmits a discovery request to NRF, containing: one or more query parameters and/or preferred locality. The preferred locality may be set to the NF service consumer's 354 locality or a desired target locality. In some embodiments, the preferred locality may be one of the one or more query parameters.

In step R2 the NRF 352 may check whether the NF service consumer 354 is authorized to perform discovery.

In step R2a the NRF 352 may search for NFs or NF services matching query parameters. The results will satisfy all of the one or more query parameters.

In step R2b the NRF 352 may further filter the results from step R2a using the preferred locality parameter received by the NRF 352 in step R1. The NRF 352 may, for example, only consider NFs/NF services in the same locality as the preferred locality parameter and/or in localities close to the preferred locality parameter. In some examples, the NRF 352 may apply some additional treatment, such as setting the priority of the fitting NFs/NF services to 'high' if they match the preferred locality parameter, or to 'medium' if they do not match the preferred locality parameter but the location is still relatively close, or to 'low' if they do not match the preferred locality parameter.

It should be appreciated that in some embodiments, the one or more query parameters are matched, the preference may or may not be matched when providing one or more NFs or NF services.

Therefore, in some examples, when the NRF 352 receives a request for discovery with such a preferred locality parameter, it may not limit its search to only NF/NF services matching the query parameters, but it may consider locality as a preference only and possibly return to the NF service consumer 354, NFs/NF services which are not necessarily matching the preferred locality. For an NF/NF service to be discovered in the search performed by the NRF 352, the NF/NF service, in some examples, will match the one or more query parameters provided by the NF service consumer 354. However, the NF/NF service may or may not match the preferred locality parameter provided by the NF service consumer 354. The preferred locality parameter may represent an optional feature of the NF/NF service. The NRF 352 may utilize the preferred locality parameter to filter NF/NF services, or it may not.

In step R3 the NRF 352 returns the result of the discovery to the NF service consumer 354. The results contain NFs/NF services that match the one or more query parameters but which do not necessarily match the preferred locality parameter. The returned NF profiles may contain all profile parameters, including the locality. The returned NF profiles may indicate the locality of the discovered NFs, should the NFs match the preferred locality parameter or not. This may allow the NF service consumer 354 to make a selection of an NF service, even if in case some of the NF services that are returned do not match the preferred locality parameter.

In other embodiments, only one or more relevant NF/NF services that match the one or more query parameters but which do not necessarily match the preferred locality parameter may be returned.

In some embodiments, the NRF 352 may be able to modify priority information in the returned NF profile or the returned NF service description. For example, the NRF 352 may set to a higher priority the NF/NF service producers which are in the preferred locality or close to the preferred locality, and set to a lower priority the NF/NF service producers which do not match the preferred locality parameter or which are far from the location of the NF service consumer. The priority may alternatively or additionally take into account the ability of the service producer to support the consumer.

In some embodiments, the preferred locality preference may, additionally, indicate what the NRF 352 behaviour should be when there is no NF or NF service matching the preferred locality parameter. For example, an NF service consumer 354 might request the NRF 352 to return everything fitting any other query parameters, or the NF service consumer 354 might request the NRF 352 to decide what to return among the NFs or NF services fitting the one or more query parameters (e.g. for the locality it would mean that NRF 352 could decide to only return NFs or NF services fitting the one or more query parameters and in a nearby locality).

In step R4, the NF service consumer selects an NF or an NF service based on the information provided by the NRF.

While, in some embodiments the NF service consumer 354 can provide a preferred locality parameter to address the locality parameter, the mechanism may be used for any other suitable type of preference parameter alternatively or additionally. For example, the NF service consumer 354 can provide "preference" parameters in the discovery request and the NRF 352 may then use these "preferences" as a guide for returning NF/NF service producers e.g. with distinct priorities based on the expressed preferences, but will not restrict its search to only NF service producers matching these "preferences" parameters.

Figure 8:
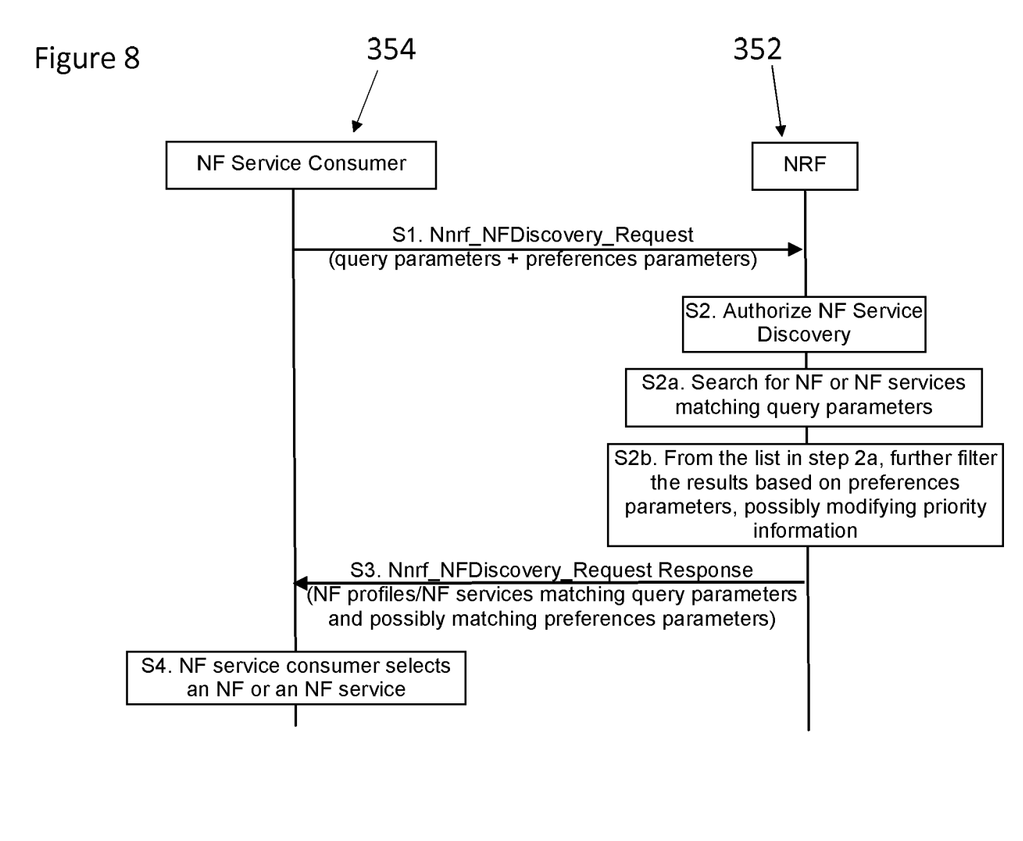

One or more of the steps may be omitted. One or more steps may be combined. One or more steps may take place in a different order to that shown. Reference is made to FIG. 8 which shows a NF/NF service discovery request procedure according to some embodiments.

In step S1 the NF service consumer 354 provides a discovery request to the NRF 352, containing at least one of, one or more query parameters and "preferences parameters". "Preference parameters" may be, for example, preferred locality, or any other suitable preference that the NF service consumer may have. The preference parameters may indicate one or more optional preferences for an NF/NF service that the NF service consumer wants.

In some embodiments, a preference parameter may represent a single preference and in other embodiments a preference parameter may represent two or more preferences. In some embodiments more than one preference parameter may be provided. The preference parameters may be provided with different priorities in some embodiments.

In some embodiments, one or more parameters may be used either as a query parameter or a preference parameter.

In some embodiments, for step S1, the NF service consumer 354 may indicate, together with preferences parameters, whether the NRF 352 should decide on NFs/NF services returned in case the preferences parameters do not match the registered profiles, or if all NFs should be returned so that the NF service consumer 354 controls the NF service producer selection. This additional indication from the NF service consumer 354 may be provided per preference parameter in some embodiments. As an example only, locality information may be better handled centrally in NRF 352 while selection based on some other preference parameter may be better handled in the NF service consumer 354.

In step S2 the NRF 352 checks whether the NF service consumer 354 is authorized to perform discover.

In step S2a the NRF 352 searches for NFs or NF services matching the one or more query parameters.

In step S2b the NRF 352 may further filter the results from step 2a using preferences parameters. The NRF 352 may also apply some additional treatment, for example, set the priority of the NFs/NF services to high if they match the preference parameters, to medium if they partly match the preference parameters, or to low if they do not match the preference parameters. In some embodiments, step S2b may be omitted.

In step S3 the NRF 352 returns the result of the discovery to the NF service consumer 354. The results contain NFs/NF services that match the one or more query parameters but which do not necessarily match the preferences parameters. Therefore, the results may contain NFs/NF services that contain one or more of said optional preferences. The returned NF profiles will contain all profile parameters, thus allowing the NF service consumer 354 to make a selection if some NFs are returned which do not match the preference parameters. For an NF/NF service to be discovered in the search performed by the NRF 352, the NF/NF service will match the one or more query parameters provided by the NF service consumer 354.

However, the NF/NF service may or may not match the preference parameters provided by the NF service consumer 354. The preference parameter may represent an optional feature of the NF/NF service. The NRF 352 may utilize the preference parameters to filter NF/NF services, or it may not.

In some embodiments, the NF service consumer 354 may indicate to the NRF 352 what to provide to the NF service consumer 354 if none of the NFs/NF services match the preference parameters. As an example, the indication of what to provide if there is no match may be received by the NRF 352 in a discovery request. In another example, the NRF 352 may have a default of what to do when no NFs/NF services match the preference parameters. In some embodiments, if the NFs/NF services match the one or more query parameters, but there is no match to the preference parameters then the NRF 352 will provide all of the NFs/NF services that matched the one or more query parameters to the NF service consumer 354. In another embodiment, if the NFs/NF services match the one or more query parameters, but there is no match to the preference parameters then the NRF 352 will decide which NFs/NF services to provide to the NF service consumer 354.

In step S4, the NF service consumer selects an NF or an NF service based on the information provided by the NRF.

One or more of the steps may be omitted. One or more steps may be combined. One or more steps may take place in a different order to that shown.

This mechanism may be applicable to control plane (CP) functions as well as be used for user plane (UP) functions.

Thus, in some embodiments, there may be a reduced signalling between NF service consumers and the NRF. The NF service consumer may not need to make multiple calls to the NRF for an NF or NF service if the NRF does not initially provide a suitable NF service to the NF service consumer.

Some embodiments may provide better flexibility for deployments, with control for selection of NF services either in the NRF, or in the NF service consumer, or both. The NF service consumer may be able to indicate one or more preferences in the service discovery request.

In some embodiments, the preferences parameters may be provided in a discovery request for selecting an NF or NF service, or both. In some examples, the one or more preference parameters may be treated independently. For example, individual preference parameters can be handled by the NRF 352 independently, possibly with a different configuration for the individual preference parameter.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a standalone 5G networks, similar principles maybe applied in relation to other examples of standalone 3G or LTE networks. It should be noted that other embodiments may be based on other cellular technology other than 5G or on variants of 5G. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising at least one processor and at least one memory including computer program code;

wherein the at least one memory and computer program code are configured, with the at least one processor, to cause the apparatus at least to:

> receive, at a network repository function, a discovery request message including preference information from a first network function, said preference information comprising location information for a respective second network function or network function service; and
>
> cause information to be provided to said first network function about one or more second network functions or network function services, said one or more second network functions or network function services being selected based on the location information in the received discovery request message, wherein in an instance no network functions are identified matching said preference information, the one or more second network functions or network function services are identified without limiting a search to second network functions or network function services that match the preference information.

2. An apparatus as claimed in claim 1, wherein a respective selected second network function or network function service optionally is provided with one or more of said optional preferences.

3. An apparatus as claimed in claim 1, wherein said location information comprises a preferred locality parameter, and wherein the at least one memory and computer program code are further configured, with the at least one processor, to cause the apparatus to search for the one or more second network functions or network function services in response to the discovery request message without limiting the search to second network functions or network function services that match the preferred locality parameter.

4. An apparatus as claimed in claim 1, wherein said preference information is received with one or more query parameters; and > wherein the at least one memory and computer program code are configured, with the at least one processor, to cause the apparatus to cause information to be provided to said first network function about the second network functions or network function services that match the one or more query parameters when there is no match to said preference information.

5. An apparatus as claimed in claim 4, wherein said at least one memory and computer program code are further configured, with the at least one processor, to cause the apparatus to provide a candidate list of second network functions or network function services in dependence on said one or more query parameters, each of said second network functions or network function services of said candidate list satisfying said one or more query parameters.

6. An apparatus as claimed in claim 5, wherein said at least one memory and computer program code are further configured, with the at least one processor, to cause the apparatus to filter said candidate list of second network functions or network function services in dependence on said preference information.

7. An apparatus as claimed in claim 5, wherein at least one memory and computer program code are further configured, with the at least one processor, to cause the apparatus to provide a priority or modify a priority of one or more second network functions or network function services in said candidate list of second network functions or network function services in dependence on said preference information.

8. An apparatus as claimed in claim 1, wherein said preference information comprises information indicating how said network repository function should select second network functions or network function services if no second network functions or network function services match the preference information.

9. An apparatus as claimed in claim 1, wherein said at least one memory and computer program code are further configured, with the at least one processor, to cause the apparatus to determine which of said second network functions or network function services is to be selected when there is no match to said preference information.

10. An apparatus comprising at least one processor and at least one memory including computer program code; wherein the at least one memory and computer program code are configured, with the at least one processor, to cause the apparatus at least to:

> cause, at a first network function, a discovery request message including preference information to be provided to a network repository function, said preference information comprising location information for a respective second network function or network function service; and
>
> receive information, from said network repository function, about one or more second network functions or network function services, said one or more second network functions or network function services being selected based on the location information in the discovery request message, wherein in an instance no network functions are identified matching said preference information, the one or more second network functions or network function services are identified without limiting a search to second network functions or network function services that match the preference information.

11. An apparatus as claimed in claim 10, wherein a respective selected second network function or network function service optionally is provided with one or more of said optional preferences.

12. An apparatus as claimed in claim 10, wherein said preference information is provided with one or more query parameters, and wherein the at least one memory and computer program code are configured, with the at least one processor, to cause the apparatus to receive information from said network repository function about the second network functions or network function services that match the one or more query parameters when there is no match to said preference information.

13. An apparatus as claimed in claim 12, wherein the at least one memory and computer program code are further configured, with the at least one processor, to cause the apparatus to receive a candidate list of second network functions or network function services in dependence on said one or more query parameters, each of said second network functions or network function services of said candidate list satisfying said one or more query parameters.

14. An apparatus as claimed in claim 13, wherein one or more of said second network functions or network function services is said candidate list is provided with a priority in dependence on said preference information.

15. An apparatus as claimed in claim 10, wherein said preference information comprises information indicating how said network repository function should select second network functions or network function services if no second network functions or network function services match the preference information.

16. A computer program product comprising a non-transitory storage medium and computer program code stored by the storage medium and adapted to, when the program is run on a processor, perform:

receiving, at a network repository function, a discovery request message including preference information from a first network function, said preference information comprising location information for a respective second network function or network function service; and causing information to be provided to said first network function about one or more second network functions or network function services, said one or more second network functions or network function services being selected based on the preference information in the received discovery request message, wherein in an instance no network functions are identified matching said preference information, the one or more second network functions or network function services are identified without limiting a search to second network functions or network function services that match the preference information.

17. A computer program product comprising a non-transitory storage medium and computer program code stored by the storage medium and adapted to, when the program is run on a processor, perform:

causing, at a first network function, a discovery request message including preference information to be provided to a network repository function, said preference information comprising location information for a respective second network function or network function service; and receiving information, from said network repository function, about one or more second network functions or network function services, said one or more second network functions or network function services being selected based on the preference information in the discovery request message, wherein in an instance no network functions are identified matching said preference information, the one or more second network functions or network function services are identified without limiting a search to second network functions or network function services that match the preference information.

18. A computer program product as claimed in claim 16, wherein said preference information is received with one or more query parameters, and wherein the computer program code is configured to cause information to be provided to said first network function about the second network functions or network function services that match the one or more query parameters when there is no match to said preference information.

19. A computer program product as claimed in claim 17, wherein said preference information is provided with one or more query parameters, and wherein the computer program code is configured to receive information from said network repository function about the second network functions or network function services that match the one or more query parameters when there is no match to said preference information.

20. A computer program product as claimed in claim 16, wherein said location information comprises a preferred locality parameter, and wherein the computer program code is configured to search for the one or more second network functions or network function services in response to the discovery request message without limiting the search to second network functions or network function services that match the preferred locality parameter.

\* \* \* \* \*